United States Patent
Yraceburu et al.

(12) 
(10) Patent No.: US 11,852,995 B2
(45) Date of Patent: Dec. 26, 2023

(54) REDUCE ZERO POWER EVENTS OF A HEATED SYSTEM

(71) Applicant: Hewlett-Packard Development Company, L.P., Spring, TX (US)

(72) Inventors: Robert Yraceburu, Vancouver, WA (US); Francisco Alcazar, Vancouver, WA (US); Daniel James Magnusson, Vancouver, WA (US); Duane A Koehler, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 549 days.

(21) Appl. No.: 15/733,789

(22) PCT Filed: Aug. 31, 2018

(86) PCT No.: PCT/US2018/049241
§ 371 (c)(1),
(2) Date: Oct. 26, 2020

(87) PCT Pub. No.: WO2020/046393
PCT Pub. Date: Mar. 5, 2020

(65) Prior Publication Data
US 2021/0245494 A1 Aug. 12, 2021

(51) Int. Cl.
*G03G 15/00* (2006.01)
*H05B 1/00* (2006.01)
(Continued)

(52) U.S. Cl.
CPC ....... *G03G 15/5004* (2013.01); *G03G 15/205* (2013.01); *G03G 15/2039* (2013.01);
(Continued)

(58) Field of Classification Search
CPC ............ G03G 15/205; G03G 15/2039; G03G 15/5004; G03G 15/80; G03G 2215/00978;
(Continued)

(56) References Cited

U.S. PATENT DOCUMENTS 4,242,554 A * 12/1980 Hurko .................. H05B 6/6482
219/486
4,829,159 A * 5/1989 Braun ................ G05D 23/1913
219/486

(Continued)

FOREIGN PATENT DOCUMENTS

CN 101228787 7/2008
CN 102957824 3/2013
(Continued)

*Primary Examiner* — Robert B Beatty
(74) *Attorney, Agent, or Firm* — Brooks, Cameron & Huebsch, PLLC

(57) ABSTRACT

According to examples, an apparatus may include a processor that may identify a first period for a heated system, the first period including a first set of power events and a first zero power event for the heated system and may identify a second period for the heated system, the second period including a second set of power events and a second zero power event for the heated system. The processor may also borrow, from the second period, a portion of a second power event of the second set of power events and may apply the borrowed portion of the second power event to a first power event of the first set of power events during the first period to remove the first zero power event from the first period.

15 Claims, 8 Drawing Sheets

(51) Int. Cl.
*G06K 15/00* (2006.01)
*G06F 3/00* (2006.01)
*G03G 15/20* (2006.01)
*H05B 1/02* (2006.01)
*G06F 3/12* (2006.01)

(52) U.S. Cl.
CPC ....... *G06F 3/1221* (2013.01); *G06K 15/4055* (2013.01); *H05B 1/02* (2013.01); *H05B 1/0241* (2013.01)

(58) Field of Classification Search
CPC .... B41J 11/002; H05B 1/0241; H05B 3/0066; H05B 47/17; H05B 47/155; H05B 47/28; G06K 15/4055; G06F 3/1221

USPC ....... 399/69, 70, 88; 219/216, 483, 485, 486
See application file for complete search history.

(56) References Cited

U.S. PATENT DOCUMENTS

| | | | |
|---|---|---|---|
| 5,789,723 | A | 8/1998 | Hirst |
| 7,892,423 | B2* | 2/2011 | Rohde ................ A61M 1/166 219/486 |
| 9,192,011 | B2 | 11/2015 | Brandt |
| 9,578,724 | B1 | 2/2017 | Knapp et al. |
| 2008/0253794 | A1* | 10/2008 | Nillesen ............ B41J 2/17593 399/88 |
| 2013/0330098 | A1 | 12/2013 | Chae |
| 2015/0226484 | A1 | 8/2015 | Doebbeler et al. |
| 2017/0077721 | A1 | 3/2017 | Soriano Fosas |
| 2018/0074442 | A1 | 3/2018 | Cao |
| 2021/0232070 | A1* | 7/2021 | Koehler ............ G03G 15/2007 |
| 2022/0019274 | A1* | 1/2022 | Yraceburu ........... G06F 1/3206 |

FOREIGN PATENT DOCUMENTS

| | | |
|---|---|---|
| CN | 103717402 | 4/2014 |
| CN | 104768275 | 7/2015 |
| CN | 105398202 | 3/2016 |
| CN | 107428158 | 12/2017 |
| WO | WO-2018010785 A1 | 1/2018 |

* cited by examiner

600

---

IDENTIFY A FIRST TIME PERIOD AND A SECOND TIME PERIOD DURING WHICH POWER IS TO BE APPLIED TO COMPONENTS OF A HEATED SYSTEM, THE FIRST TIME PERIOD INCLUDING A FIRST SET OF POWER EVENTS AND A FIRST ZERO POWER EVENT FOR THE COMPONENTS AND THE SECOND TIME PERIOD INCLUDING A SECOND SET OF POWER EVENTS AND A SECOND ZERO POWER EVENT FOR THE COMPONENTS
602

↓

ASSIGN A PORTION OF A SECOND POWER EVENT OF THE SECOND SET OF POWER EVENTS FROM THE SECOND TIME PERIOD
604

↓

APPLY THE ASSIGNED PORTION OF THE SECOND POWER EVENT TO THE FIRST POWER EVENT DURING FIRST TIME PERIOD TO REMOVE THE FIRST ZERO POWER EVENT FROM THE FIRST TIME PERIOD
606

↓

ADD A TIME CORRESPONDING TO THE FIRST ZERO POWER EVENT FROM THE FIRST TIME PERIOD TO ANOTHER ZERO POWER EVENT IN ANOTHER TIME PERIOD
608

*FIG. 6*

NON-TRANSITORY COMPUTER READABLE MEDIUM
800

FOR A MAINTENANCE HEATING CYCLE OF A HEATED SYSTEM, IDENTIFY A FIRST TIME PERIOD AND A SECOND TIME PERIOD DURING WHICH POWER IS TO BE APPLIED TO COMPONENTS OF THE HEATED SYSTEM
802

TRACK A CREDIT CORRESPONDING TO A SECOND POWER EVENT TO BE APPLIED TO A FIRST POWER EVENT
804

APPLY THE TRACKED CREDIT TO THE FIRST POWER EVENT
806

*FIG. 8*

REDUCE ZERO POWER EVENTS OF A HEATED SYSTEM

BACKGROUND

Printing images or text on printable media in a printer includes various media processing activities, including pick-up, delivery to a print engine, printing, and conditioning of sheets of printable media. Conditioning may involve heating and pressing the sheets through or past a heated conveying component, such as a heated pressure roller (HPR), to remove liquid (for printers using liquid ink), to remove wrinkles or curvature, and/or to reform or flatten fibers in the sheets. Other examples of conditioners may include a resistive dryer and a heating lamp.

BRIEF DESCRIPTION OF DRAWINGS

Features of the present disclosure are illustrated by way of example and not limited in the following figure(s), in which like numerals indicate like elements, in which:

FIGS. 6 and 7, respectively, depict flow diagrams of example methods for power arbitration in a heated system; and FIG. 8 shows an example non-transitory computer readable medium for application of power to a heated system to smooth power delivery to the heated system.

DETAILED DESCRIPTION

Figure 1:
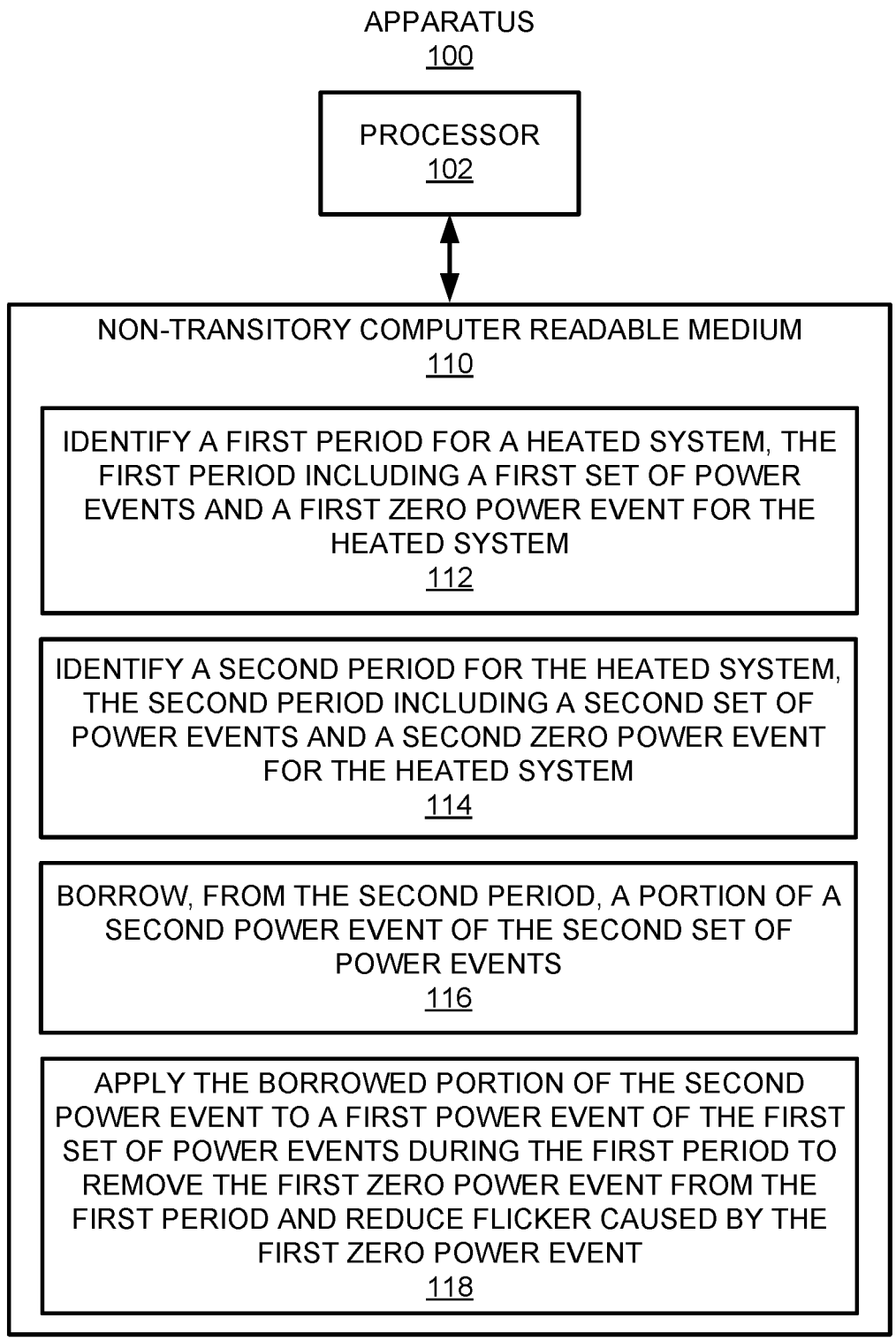
FIG. 1 depicts a block diagram of an example apparatus that may generate control signals for a heated system to smooth power delivery to the heated system.

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Many printers, such as inkjet printers, may include a heated system that may, for example, help reduce media curl and ink smear, and may improve quality in printed output. The heated systems may include conditioning mechanisms, such as, dryers, fusers, pressure rollers, calendaring rollers, belts, etc. Heated systems may include a heat generating device or multiple heating components that, when a media is to be conditioned may be supplied with a maximum amount of available power to quickly ramp up the temperature in the heated system to a target temperature. By supplying the maximum amount of available power during the ramp up period, the temperature may be increased to the target temperature in a minimized length of time. Following the ramp up period, the temperature in the heated system may be maintained at or near the target temperature for a duration of a print job, e.g., during a steady-state operation period using a maintenance control signal that may include zero power events interspersed with power application events.

Some heated systems may include multiple heating components, such as both a heating lamp and a resistive heating element, while other heated systems may include multiple heating lamps and/or multiple resistive heating elements. During the steady-state operation period, power may be applied to the heated system components in periods (or equivalently, cycles). Some or all of the periods may include a zero power event during which power is not applied to the heating components. The application of power to the heating components, e.g., heating lamps and the resistive heating elements, may be cycled with the zero power events to maintain the temperatures of conditioning mechanisms in the heated system within respective predefined temperature ranges. That is, continuous application of full power to the heating lamp and/or resistive heating elements during the steady-state power application cycle may cause temperatures in the heated system above respective predefined temperature ranges.

However, inclusion of the zero power events during the power application cycles may cause power delivery to the heated system to be uneven or choppy and thus, the delivery of power to the heated system may not be smooth. The uneven delivery of power may cause flicker, e.g., power-line flicker, to occur. Flicker may be defined as a visible change in brightness of lamps due to rapid fluctuations in the voltage of a power supply. For instance, a voltage drop may be generated over a source impedance of a grid by the changing load current of the heating lamps and/or the resistive heating elements. In a printer, the zero power events may cause flicker in lights that may share the same circuit path as the printer. In addition, or alternatively, the uneven or choppy delivery of the power to the heated system may negatively affect power line harmonics and conducted electro-magnetic compatibility (EMC) emissions.

Disclosed herein are apparatuses, heated systems, methods, and computer readable mediums that may smooth the delivery of power to heated systems caused by the zero power events occurring during power application cycles of a heated system. By smoothing the delivery of power, power line harmonics and conducted EMC emissions may be improved, and/or flicker may be reduced. In addition, smoothing of the power delivery may reduce the amount of phase control used to warm up heating lamps in the heated system, which may cause conducted emissions to be reduced, such that the size and cost of AC line filters may be reduced, and the heating lamps may be warmed up in a relatively shorter length of time, which may improve a first page out time.

As disclosed herein, the number of zero power events occurring may be reduced while maintaining the temperatures of the conditioning mechanisms in the heated system within predefined temperature ranges. According to examples, the number of zero power events may be reduced through power arbitration between various periods of the power application cycle. That is, for instance, a power event may be borrowed from one of the periods, e.g., credited in an arbitration ledger, and may be applied to a power event in another one of the periods, e.g., debited from the arbitration ledger. In addition, the debiting may include the increase in the durations of zero power events in some of the periods to compensate for the removal of the zero power events in some of the other periods. In some examples, by balancing out the credits and debits in the arbitration ledger across multiple ones of the periods, the number of zero power events may be reduced while maintaining desired power application to the heated system components.

According to examples, by reducing the flicker caused by the application of power to the heated system components as disclosed herein, the heated system components may pass flicker testing requirements, e.g., may comply with international standards pertaining to flicker testing.

Throughout the present disclosure, the terms "a" and "an" are intended to denote one of a particular element or multiple ones of the particular element. As used herein, the term "includes" means includes but not limited to, the term "including" means including but not limited to. The term "based on" may mean based in part on.

Figure 2A:
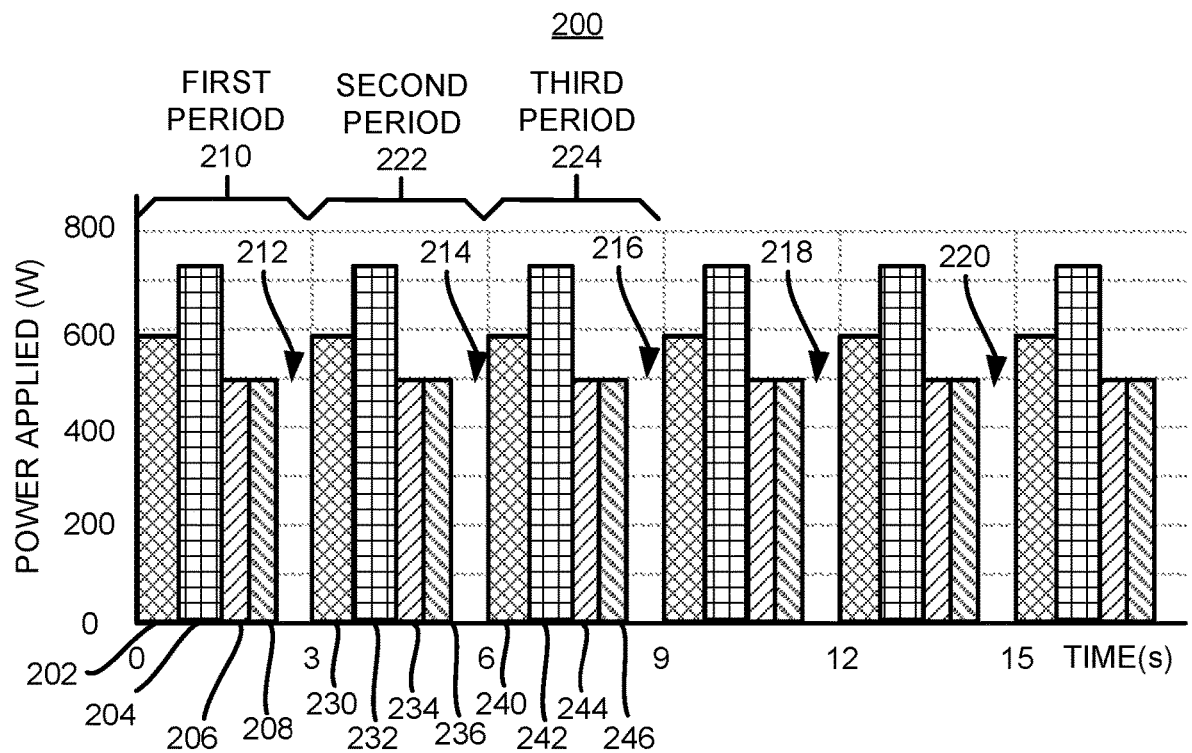
FIGS. 2A and 2B, respectively, show example power application graphs that depict the application of power over time to a plurality of components of a heated system.
Figure 2B:
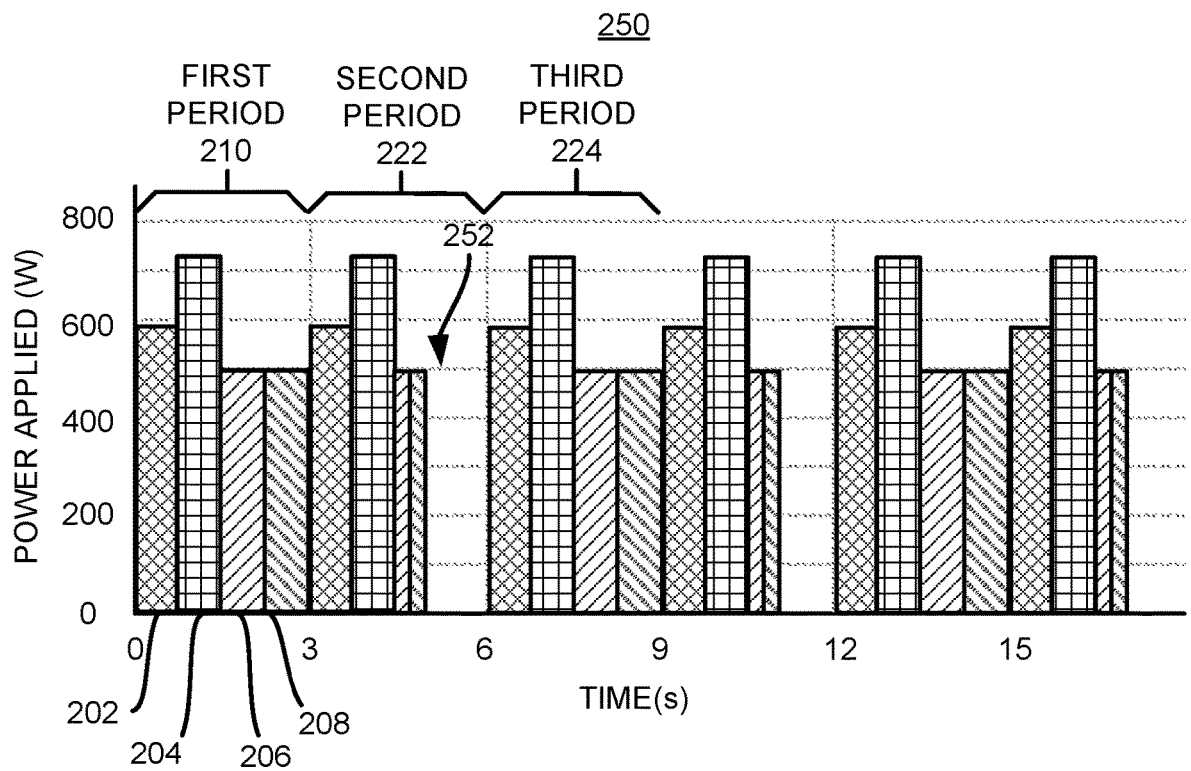

Reference is first made to FIGS. 1, 2A, and 2B. FIG. 1 shows a block diagram of an example apparatus 100 that may generate control signals for a heated system to smooth power delivery to the heated system. FIGS. 2A and 2B, respectively, show example power application graphs 200, 250 that depict the application of power over time to a plurality of components of a heated system. It should be understood that the example apparatus 100 depicted in FIG. 1 and/or the example power application graphs 200, 250 depicted in FIGS. 2A and 2B may include additional features and that some of the features described herein may be removed and/or modified without departing from the scopes of the apparatus 100 and/or the power application graphs 200, 250.

Generally speaking, the apparatus 100 may be a computing apparatus, e.g., a personal computer, a laptop computer, a tablet computer, a smartphone, or the like. In these examples, the apparatus 100 may be separate from a heated system and may communicate instructions to the heated system over a direct or a network connection. In other examples, the apparatus 100 may be part of the heated system. In these examples, the apparatus 100 may be part of a control system of the heated system and may communicate instructions to components of the heated system, for instance, over a communication bus.

Figure 3:
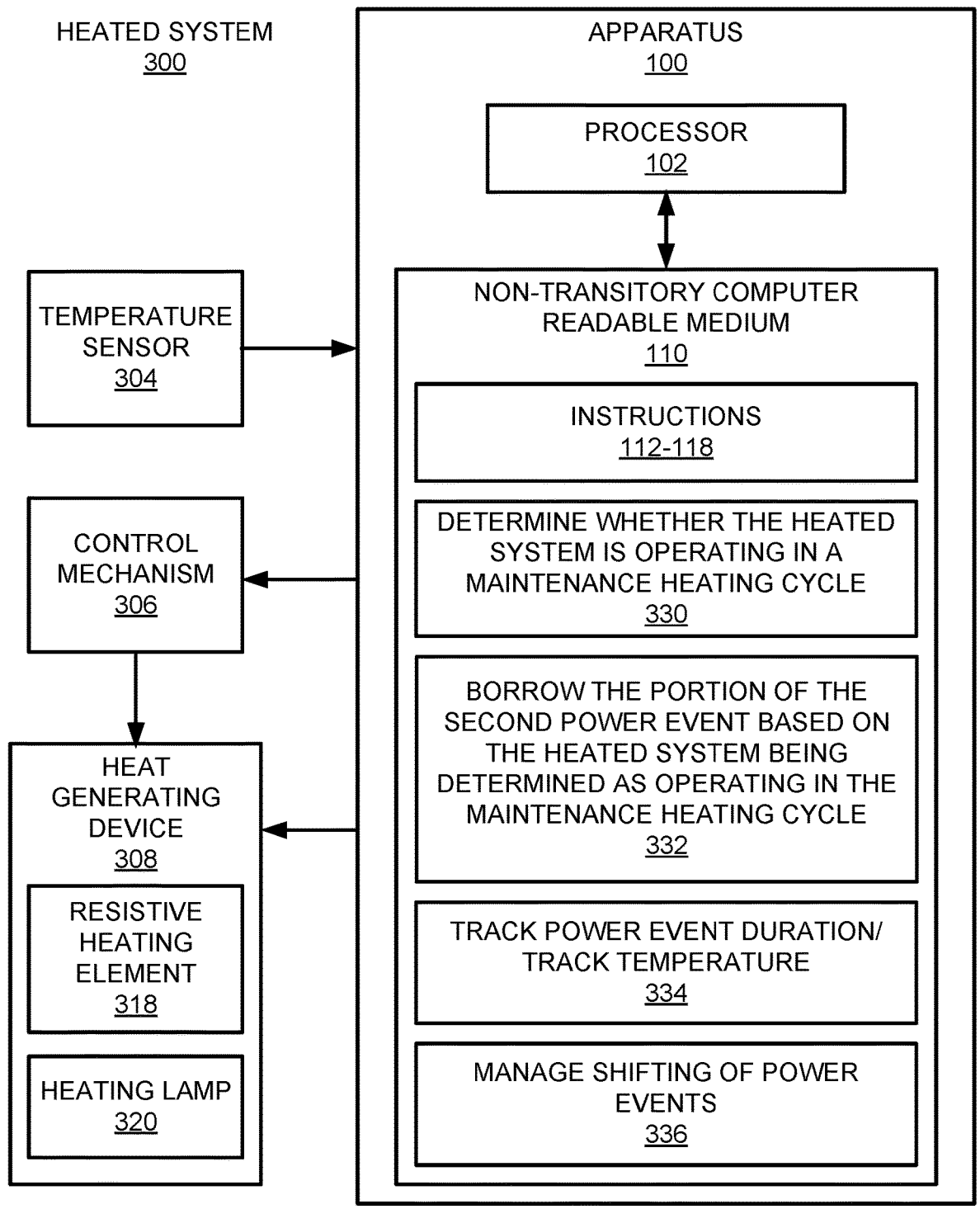
FIG. 3 shows a block diagram of an example heated system that may include the apparatus depicted in FIG. 1, in which the apparatus may control a heat generating device during a steady-state temperature control operation.
Figure 4:
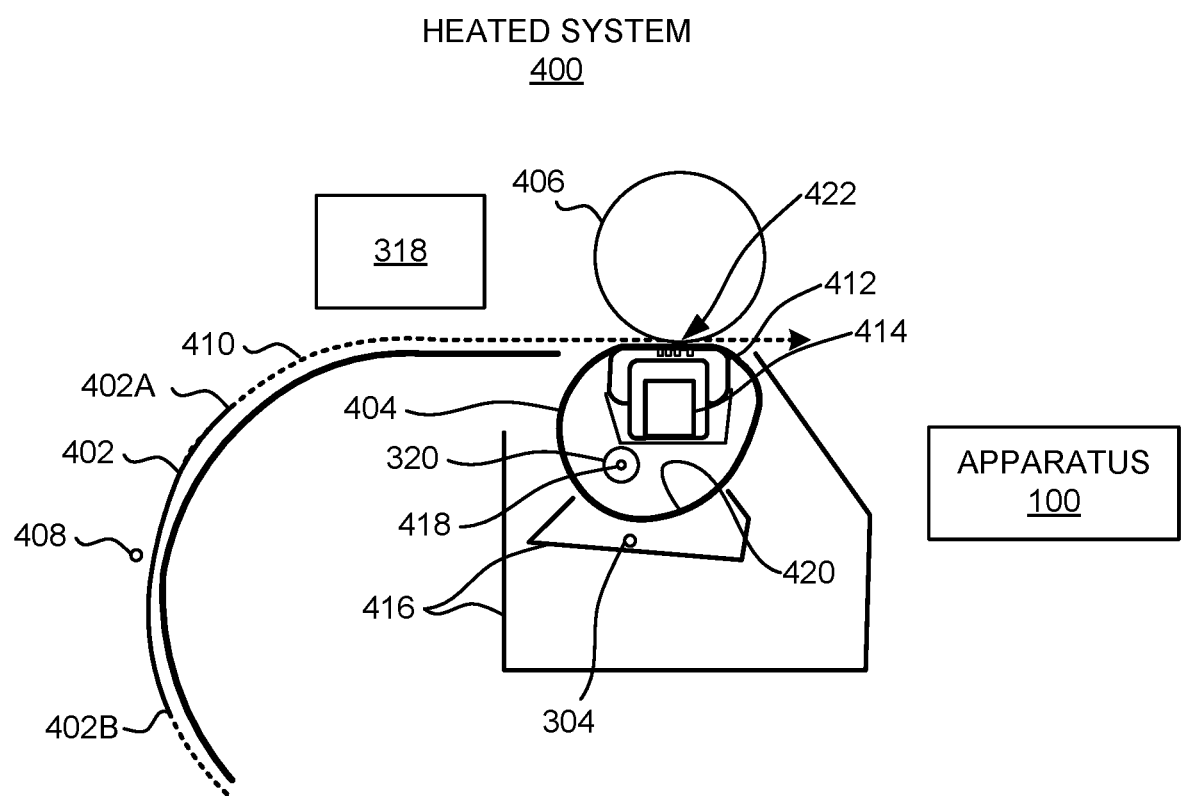
FIG. 4 shows a schematic diagram of an example heated system that may include the apparatus depicted in FIG. 1.
Figure 5:
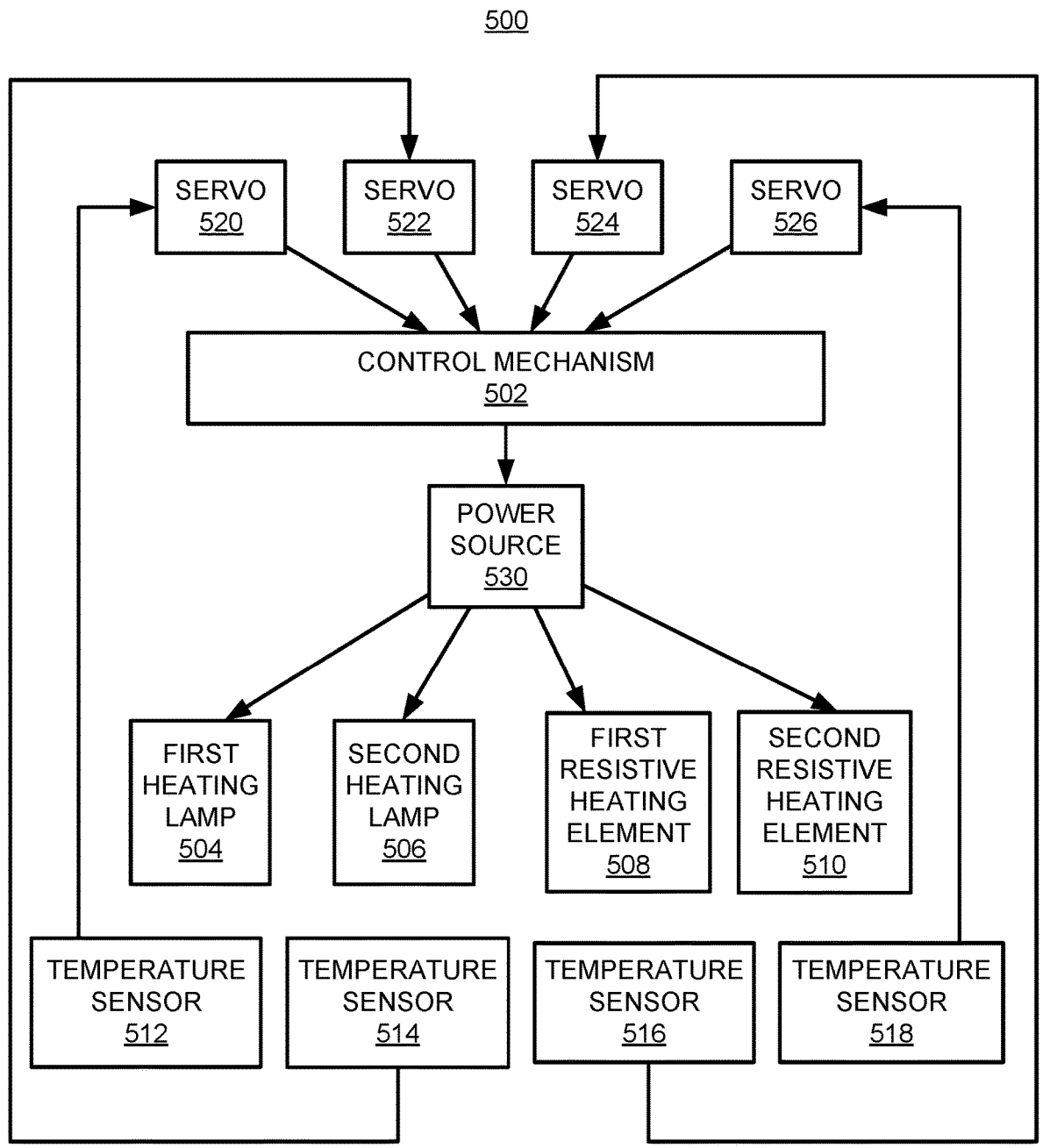
FIG. 5 shows a block diagram of example heated system components that may be included in the heated systems depicted in FIGS. 3 and 4.

The heated system may be a system in which an object, such as a sheet of media, may be heated. According to examples, the heated system may be part of a media printing system (not shown) in which the heated system may condition, e.g., apply heat, to media upon which a printing substance, e.g., ink, toner, or the like, has been applied. That is, for instance, the heated system may be positioned downstream of a print engine of the media printing system. In other examples, the heated system may be implemented to condition other types of objects, e.g., 3D printed objects, painted objects, or the like. Example heated systems are depicted in FIGS. 3-5, which are described in greater detail herein below.

In some examples, the apparatus 100 may control the application of power to the components of the heated system, for instance, as shown in the power application graphs 200, 250 depicted in FIGS. 2A and 2B. According to examples, the apparatus 100 may apply power as shown in the power application graphs 200, 250, e.g., with zero power events during which no power is applied, during a steady-state operation application operation of the heated system. That is, the apparatus 100 may apply power with the zero power events following an initial ramp up period during which power may be applied without any zero power events.

As shown in FIGS. 2A and 2B, power may be applied to the components of the heated system in periods or cycles, e.g., in 3 second periods, although the periods may have other durations. The zero power events may be included in the application of power to the components of the heated system to maintain the temperatures of the components and/or the corresponding components heated by the heated system (e.g., belt drives heated by the heating lamp) within respective predefined temperature ranges. That is, constant application of full power to the components during the steady-state (or, equivalently, maintenance period), may cause the temperatures of the components and/or the corresponding components heated by the heated system to exceed the predefined temperature ranges. Operating the components outside of the predefined temperature ranges may prevent objects from being conditioned properly and/or may cause the components to operate at unintended temperatures.

According to examples, the heated system may include a plurality of heating components, e.g., a first heating lamp, a second heating lamp, a first resistive element, and a second resistive element, although the heated system may have fewer or additional heating components. As shown in FIG. 2A, power may be applied to each of the components individually over time. For instance, during a first period 210, power 202-208 may be applied in order to the first heating lamp, the second heating lamp, the first resistive element, and the second resistive element. Following application of power 208 to the second resistive element, a first zero power event 212 may occur, in which power is not applied to any of the components. This process may be repeated for additional cycles in which additional zero power events 214-220 may occur in further periods, e.g., a second period 222, a third period 224, etc.

According to examples, the apparatus 100 may apply power as shown in the power application graph 250 to reduce or minimize the number of the zero power events 212-220 during the steady-state operation to smooth power delivery to the heated system. For instance, by reducing the number of zero power events 212-220 and by increasing the durations of the remaining zero power events 252, the number of power fluctuation causing events may be reduced over the steady-state power application cycle while causing the heating components and/or corresponding conditioning mechanisms heated by the components to remain within predefined temperature ranges.

According to examples, the apparatus 100 may implement arbitration credits and debits to track the borrowing of a power application event (which is also recited herein as a power event) from one period and the application of the borrowed application event to another period. In one regard, by shifting the zero power events such that, for instance, the remaining zero power events may have longer durations, the number of zero power events during the steady-state power application operation may be reduced or minimized, which may smooth power delivery, and which may reduce flicker caused by the zero power events. Various manners in which the apparatus 100 may operate are discussed in greater detail herein.

As shown in FIG. 1, the apparatus 100 may include a processor 102, which may control operations of the apparatus 100. The processor 102 may be a semiconductor-based microprocessor, a central processing unit (CPU), an application specific integrated circuit (ASIC), a field-programmable gate array (FPGA), graphics processing unit (GPU), a tensor processing unit (TPU), and/or other suitable hardware device. The apparatus 100 may also include a non-transitory computer readable medium 110 that may have stored thereon machine readable instructions 112-118 (which may also be termed computer readable instructions) that the processor 102 may execute. The non-transitory computer readable medium 110 may be an electronic, magnetic, optical, or other physical storage device that contains or stores executable instructions. The non-transitory computer readable medium 110 may be, for example, Random Access memory (RAM), an Electrically Erasable Programmable Read-Only Memory (EEPROM), a storage device, an optical disc, and the like. The term "non-transitory" does not encompass transitory propagating signals.

The processor 102 may fetch, decode, and execute the instructions 112 to identify a first period 210 for a heated system. The first period 210 may include a first set of power events 202-208 and a first zero power event 212 for the heated system. The first set of power events 202-208 may correspond to a power event 202 for the first heating lamp, a power event 204 for the second heating lamp, a power event 206 for the first resistive element, and a power event 208 for the second resistive element. The processor 102 may identify the first set of power events 202-208 and the first zero power event 212 as events that are to occur during performance of the first period 210 of the steady-state power application operation. In addition, each of the first set of power events 202-208 may include an event during which power is applied to one of the components for a duration of time as shown in FIG. 2A.

The processor 102 may fetch, decode, and execute the instructions 114 to identify a second period 222 for the heated system. The second period 222 may include a second set of power events 230-236 and a second zero power event 214. The second set of power events 230-236 may correspond to another power event 230 for the first heating lamp, another power event 232 for the second heating lamp, another power event 234 for the first resistive element, and another power event 236 for the second resistive element. The processor 102 may identify the second set of power events 230-236 and the second zero power event 214 as events that are to occur during performance of the second period 222 of the steady-state power application operation.

The processor 102 may also fetch, decode, and execute the instructions 114 to identify a third period 224 for the heated system. The third period 224 may include a third set of power events 240-246 and a third zero power event 216. The third set of power events 240-246 may correspond to a further power event 240 for the first heating lamp, a further power event 242 for the second heating lamp, a further power event 244 for the first resistive element, and a further power event 246 for the second resistive element. The processor 102 may identify the third set of power events 240-246 and the third zero power event 216 as events that are to occur during performance of the third period 224 of the steady-state power application operation.

The processor 102 may fetch, decode, and execute the instructions 116 to borrow, from the second period 222, a portion of a second power event 234, 236 of the second set of power events 230-236. As used herein, a "portion" may include a subpart or all of the second power event(s) 234, 236, unless specifically stated otherwise. According to examples, the processor 102 may borrow a plurality of second power events 234, 236 from the second period 222. The second power event 236 may be defined as a power event that occurs during the second period 222. In addition, or alternatively, the processor 102 may borrow a portion of a second power event 234, 236. Thus, for instance, the processor 102 may borrow a portion of one of the second power event(s) 234, 236. In this regard, references made herein to the borrowing a power event may also be defined as borrowing a portion of a power event.

The processor 102 may fetch, decode, and execute the instructions 118 to apply the borrowed portion second power event 234 or second power events 234, 236, to a first power event of the first set of power events during the first period 210 to remove the zero power event 212 from the first period 210 and smooth power delivery to the heated system. As shown in FIG. 2B, the processor 102 may apply the borrowed portion of the second power event 234, 236 from the second period 222 to the power events 206, 208 of the first resistive element and the second resistive element during the first period 210. As further shown in FIG. 2B, the durations of the power events 206, 208 for the first resistive element and the second resistive element may be extended from those shown in FIG. 2A such that the zero power event 212 may be removed from the first period 210.

In addition, the processor 102 may increase a duration of time of the second zero power event 214 to compensate for the application of the borrowed portions of the second power events 234, 236 to the power events 206, 208 in the first period 210. For instance, the processor 102 may add the duration of time corresponding to the first zero power event 212 or a portion of the duration of time to the second zero power event 214. A zero power event 252 having the increased duration is depicted in FIG. 2B.

In some examples, the processor 102 may continue the borrowing and application of the borrowed power events among various periods. Generally speaking, by borrowing the power events from some of the periods and applying the borrowed power events to the power events in other ones of the periods to remove some of the zero power events, the number of zero power events 212-220 may be reduced while applying a similar amount of power to the components over a steady-state power application cycle. In this regard, the components and/or conditioning mechanisms heated by the components may be maintained within respective predefined temperature ranges, e.g., preset operating temperature ranges, while smoothing power delivery to the components of the heated system. As discussed herein, reducing the number of zero power events may reduce flicker caused by the zero power events.

According to examples, and as shown in FIGS. 2A and 2B, the processor 102 may borrow power events from the components of the heated system that are to be supplied with a lower amount of power than the components that are to be supplied with a greater amount of power. For instance, as also shown in FIGS. 2A and 2B, the processor 102 may apply the borrowed power events to the components that are to be supplied with a lower amount of power than the components that are to be supplied with a greater amount of power. In other examples, the processor 102 may borrow power events from the components of the heated system that are to be supplied with a greater amount of power than the components that are to be supplied with a lower amount of power. In addition, the processor 102 may apply the borrowed power events to the components that are to be supplied with a greater amount of power than the components that are to be supplied with a lower amount of power.

According to examples, the processor 102 may prioritize the borrowing and the application of the power events from a component having a longer thermal time constant as compared to the other components. The components with longer thermal time constants may have less temperature variation when power events are shifted in time, as compared to components with smaller thermal time constants. In addition, or alternatively, the processor 102 may prioritize periods where a zero power event is relatively shorter than other periods as the period to borrow power, and likewise may prioritize the periods where the zero power event is relatively longer to lend power, to reduce temperature variation that may result as a consequence of the borrowing and application of the power events.

Although the first period 210 is depicted in FIGS. 2A and 2B as occurring prior to the second period 222 and the third period 224, in other examples, the first period 210 may occur following the second period 222 and/or the third period 224. In these examples, the processor 102 may borrow a power event from the period that occurs prior to a period during which the processor 102 may apply the borrowed power event. In addition or in other examples, the processor 102 may borrow power events from multiple periods and may apply the borrowed power events in multiple periods. Moreover, although particular reference is made herein with respect to borrowing a portion of a power event from a second set of power events, it should be understood that a portion of a power event from a third set of power events may equivalently be borrowed and may be applied to multiple other power events in other time periods.

Reference is now made to FIGS. 1-4. FIG. 3 shows a block diagram of an example heated system 300 that may include the apparatus 100 depicted in FIG. 1, in which the apparatus 100 may control a heat generating device 308 during a steady-state temperature control operation. FIG. 4 shows a schematic diagram of an example heated system 400 that may include the apparatus 100 depicted in FIG. 1. It should be understood that the example heated system 300 depicted in FIG. 3 and/or the example heated system 400 depicted in FIG. 4 may include additional features and that some of the features described herein may be removed and/or modified without departing from the scopes of the heated system 300 and/or the heated system 300. In addition, it should be understood that either or both of the example heated systems 300 and 400 may have configurations other than the configurations shown in FIGS. 3 and 4.

As shown in FIGS. 3 and 4, the heated systems 300, 400 may include a heat generating device 308, a temperature sensor 304, a control mechanism 306 of the heat generating device 308 (e.g., heating component 308), and the apparatus 100 depicted in FIG. 1. In addition, the heat generating device 308 may include a resistive heating element 318 and a heating lamp 320. In examples, the heating lamp 320 and the resistive dryer 318 may heat a sheet of media 402. For instance, the heated systems 300, 400 may include a first conveying component coupled to engage a second conveying component to receive, contact, heat, and convey the sheet of media 402. In this example, the first conveying component may be a conditioning mechanism 404, such as a heated belt 404, and the second conveying component may be a driven roller, which may be driven to rotate by a motor (not shown). Although not shown, the heat generating device 308 may include a second resistive heating element and a second heating lamp.

The heated system 400 may also include a media sensor 408 disposed along a media path 410, a platen 412, and a platen support structure 414 to support and guide the conditioning mechanism 404, and a chassis 416. In width, the conditioning mechanism 404, roller 406, platen 412 and the platen support structure 414 may extend "into the page" of FIG. 4. The media sensor 408 may sense and generate a signal in response to a sheet of printable media 402 being proximal the media sensor 408. The media 402 may be moving or may be stationary. The sheet of media 402 may be located on the media path 410 within the sensing range of the media sensor 408. The sheet of media 402 may include a leading edge 402A and a trailing edge 402B, named based on the intended direction of travel of the sheet of media 402. The leading edge 402A may be located beyond the media sensor 408, and the trailing edge 402B has not yet reached the media sensor 408. The media sensor 408 may detect the leading edge 402A, the trailing edge 402B, or the body of the sheet of media 402 between the edges 402A, 402B.

The heating lamp 320 may be a radiant heater, which may include a heating element 418. The heating lamp 320 may extend within the belt 404 to heat a heating zone 420 of the belt 404 by thermal radiation. The heating zone 420 may include the portions of the belt 404 that are in the field of view of the heating lamp 320 at any given moment in time. In various examples, the heated system 300, 400 may include multiple heating lamps, which may be designed and arranged to heat different portions of the belt 404. During operation, the roller 406 may conductively be heated by contact with the belt 404, and a length or a piece of media 402, when present, may be heated by contact with the belt 404 and the roller 406. In some examples, the heating lamp 320 may be disposed outside of the belt 404. The heating element 320 may be a halogen-type lamp, but other types of lamps or other types of heating elements may be used to heat the belt 404 and/or the roller 406.

The belt 404 and the roller 406 may contact and press against each other along a nip region 422 to receive and convey the media 402. The nip region 422 may extend along the shared width of the belt 404 and the roller 406. During operation, rotational movement of the roller 406 may drive the belt 404 to rotate by friction or by gearing, with or without media, in between the roller 406 and the belt 404. In addition, the temperature sensor 304 may monitor the temperature of the belt 404 to facilitate control by the processor 102 of the heating lamp 320. The temperature sensor 304 may be a non-contacting thermistor located outside and below the belt 404. Although a single temperature sensor 304 is depicted in FIGS. 3 and 4, additional sensors may be disposed at different locations along the width of the belt 404 as well as at other locations. Other examples may include another form of non-contact temperature sensor or may include a contact temperature sensor located in another appropriate position.

The resistive heating element 318 of the heat generating device 308 may generate heat that may be directed to the sheet of media 402 as the media 402 is fed to further condition the media 402. For instance, the resistive heating element 318 may include a resistive component that may become heated as a current is applied through the resistive component.

The apparatus 100 may control the heating lamp 320 and the resistive heating element 318 via the control mechanism 306 and may receive input from the temperature sensor 304. Particularly, for instance, the apparatus 100 may determine that the heated system 300, 400 is to be implemented to apply heat to an object, for instance, a sheet of media 402. The apparatus 100 may make this determination based on receipt of an instruction from a processor in a printing device, based on receipt of a signal from the media sensor 408, or the like.

Based on the determination, the apparatus 100 may initiate supply of power to the heating lamp 320 for a period of time and may initiate supply of power to the resistive heating element 318 as discussed in detail herein. In addition, in instances in which the heat generating device 308 includes multiple heating lamps and multiple resistive heating elements, the apparatus 100 may initiate supply of power 202-208 to the heating lamps and multiple resistive heating elements for periods of time as discussed herein. The apparatus 100 may directly control the supply of power to the heating lamp(s) 320 and/or the resistive heating element(s) 318, e.g., without implementing the control mechanism 306. In addition, although the control mechanism 306 is depicted as being separate from the apparatus 100, in some examples, the control mechanism 306 may be integral with the apparatus 100. That is, for instance, the control mechanism 306 may be a feedback controller that the apparatus 100 may execute or implement.

The non-transitory computer readable medium 110 may have stored thereon machine readable instructions 330-336 in addition to the instructions 112-118 that the processor 102 may execute. The processor 102 may fetch, decode, and execute the instructions 330 to determine whether the heated system 300, 400 is operating in a maintenance heating cycle. The maintenance heating cycle may be a heating cycle that the processor 102 may implement to maintain the conditioning mechanism 404 within a predefined temperature range using the heating lamp(s) 320 and the resistive heating element(s) 318 following a ramp up cycle. The processor 102 may operate the heated system 300, 400 in the maintenance heating cycle following operation of the heated system 300, 400 in a ramp up cycle, during which, for instance, the processor 102 may apply full power to the heating lamp(s) 320 and the resistive heating element(s) 318. During the maintenance heating cycle, which is also referenced herein as a steady-state power control operation cycle, the processor 102 may include zero power events 212-220 during power events as discussed herein.

The processor 102 may fetch, decode, and execute the instructions 332 to, based on a determination that the heated system 300, 400 is operating in a maintenance heating cycle, borrow a portion of the second power event 234, 236 from the second period 222. The processor 102 may borrow a portion of the second power event 234, 236 as discussed above with respect to the instructions 116. However, based on a determination that the heated system 300, 400 is not operating in a maintenance heating cycle, the processor 102 may not borrow the portion of the second power event 234, 236. Instead, for instance, the processor 102 may apply full power to the heating lamp(s) 320 and the resistive heating element(s) 318 based on a determination that the heated system 300, 400 is operating in a ramp-up cycle or may apply little or no power to the heating lamp(s) 320 and the resistive heating element(s) 318 based on a determination that the heated system 300, 400 is in an idle state.

The processor 102 may fetch, decode, and execute the instructions 334 to track a duration of time corresponding to the borrowing from the second power event 234, 236. In addition, the processor 102 may fetch, decode, and execute the instructions 336 to manage the shifting of power events based on the tracked duration of time. For instance, the processor 102 may determine whether the tracked duration of time exceeds a predefined threshold and based on the tracked duration of time being determined to exceed the predefined threshold, cause a zero power event corresponding to the tracked duration of time to be applied to another time period. That is, the processor 102 may add a zero power event corresponding to the tracked duration of time to another zero power event in another time period. The predefined threshold may correspond to a duration of time of a zero power event that is to occur during a first time 210.

In addition, or alternatively, the processor 102 may fetch, decode, and execute the instructions 334 to determine whether application of the portion of the second power event 234, 236 to the first power events 206, 208 (for the first and second heat resistive elements) during the first period 210 is to cause a temperature of a component (e.g., the first and/or second heat resistive elements or a conditioning component such as the belt 404) of the heated system 300, 400 to exceed the temperature bound for the component. The temperature bound for the component may be a manufacturer specified temperature limit, may be determined through testing, may be user-defined, or the like.

The processor 102 may fetch, decode, and execute the instructions 336 to, based on the application of the portion of the second power event 234, 236 to the first power events 206, 208 being determined as causing the temperature of the heat generating component and/or a corresponding component heated by the heat generating component to be below the temperature bound, the processor 102 may borrow the portion of the second power event 234, 236 and may apply the borrowed portion of the second power event 234, 236 to the first power events 206, 208 as discussed above with respect to the instructions 116 and 118. However, based on the application of the portion of the second power event 234, 236 to the first power events 206, 208 being determined as causing the temperature of the heat generating component or a corresponding component heated by the heat generating component to exceed the temperature bound, the processor 102 may not borrow the portion of the second power event 234, 236 from the second period 222. In other examples, the processor 102 may still borrow the portion of the second power event 234, 236 but may not apply the borrowed portion of the second power event 234, 236 to the first power events 206, 208. Instead, the processor 102 may apply the borrowed portion of the second power event 234, 236 to another power event in another time period.

In addition, or alternatively, the processor 102 may fetch, decode, and execute the instructions 334 to track a plurality of durations of time corresponding to a plurality of borrowed portions of power events and may determine whether the tracked plurality of borrowed durations of time exceeds a predefined threshold. The processor 102 may also fetch, decode, and execute the instructions 336 to, based on the tracked plurality of borrowed durations of time being determined to exceed the predefined threshold, cause a zero power event corresponding to the tracked plurality of borrowed durations of time to be applied to another period for the heated system 300, 400.

Reference is now made to FIGS. 1-5. FIG. 5 shows a block diagram of example heated system components 500 that may be included in the heated systems 300, 400 depicted in FIGS. 3 and 4. It should be understood that the example heated system components 500 depicted in FIG. 5 may include additional features and that some of the features described herein may be removed and/or modified without departing from the scope of the heated system components 500. In addition, it should be understood that the example heated system components 500 may have a configuration other than the configuration shown in FIG. 5.

As shown in FIG. 5, the heated system components 500 may include a control mechanism 502, which may be equivalent to the processor 102, that may control the application of power to a first heating lamp 504, a second heating lamp 506, a first resistive heating element 508, and a second resistive heating element 510. The heated system components 500 may also include temperature sensors 512-518 that may detect temperatures respectively around or near a conditioning mechanism, e.g., belt 404, heated by the first heating lamp, the second heating lamp, the first resistive heating element, and the second resistive heating element. The detected temperatures may be communicated to respective servos 520-526, which may determine corrective feedback based on the received temperatures and may send the corrective feedback information to the control mechanism 502. The control mechanism 502 may control application of power from a power source 530 to the first heating lamp 504, the second heating lamp 506, the first resistive heating element 508, and the second resistive heating element 510 based on the corrective feedback information. For instance, the control mechanism 502 may apply power over a steady-state power application cycle to the first heating lamp 504, the second heating lamp 506, the first resistive heating element 508, and the second resistive heating element 510 as discussed above with respect to the power application graphs 200, 250.

Figure 7:
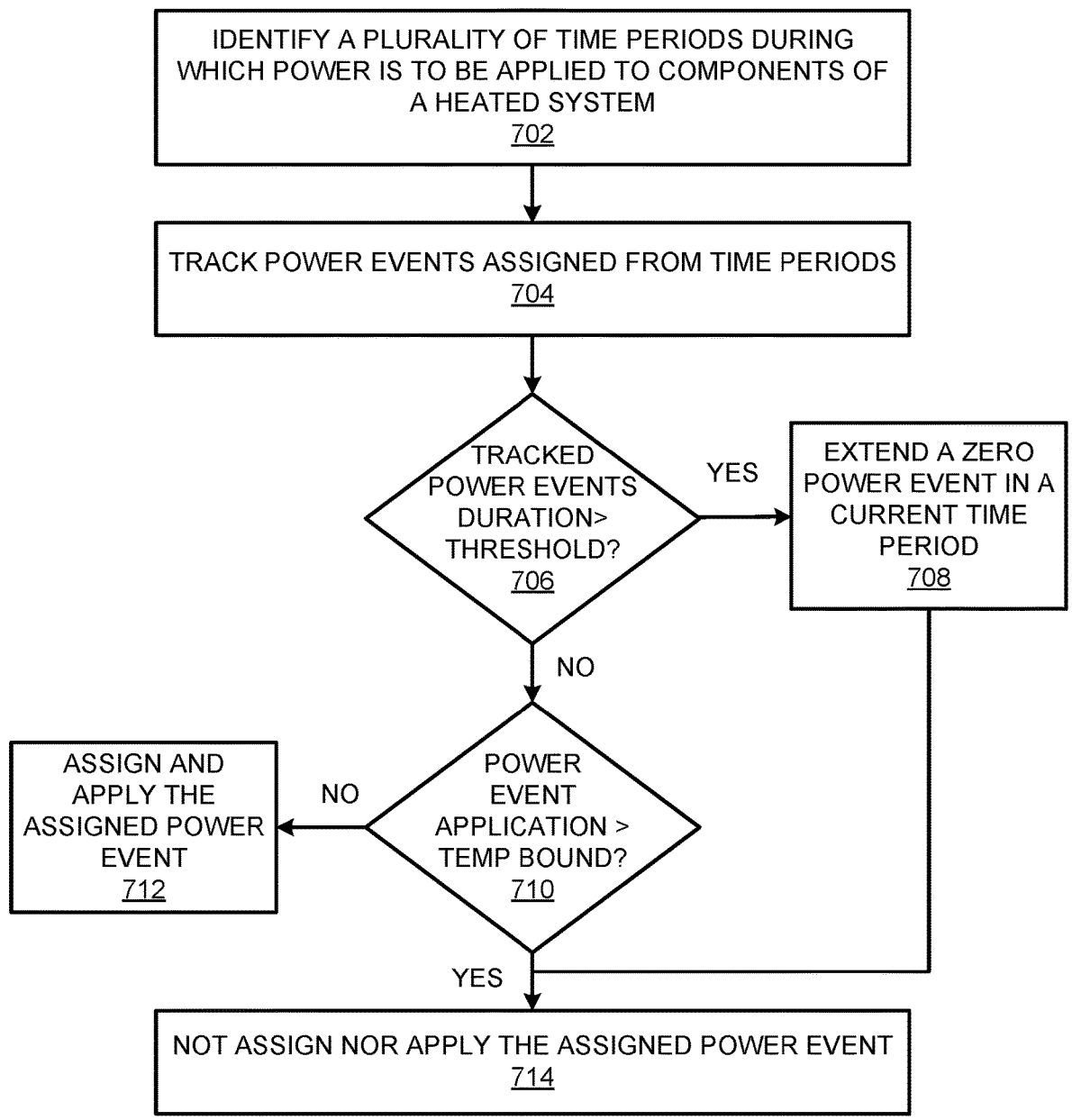

Various manners in which the processor 102 may operate are discussed in greater detail with respect to the methods 600 and 700 respectively depicted in FIGS. 6 and 7. Particularly, FIGS. 6 and 7, respectively, depict flow diagrams of example methods 600 and 700 for power arbitration in a heated system 300, 400. It should be understood that the methods 600 and 700 may include additional operations and that some of the operations described herein may be removed and/or modified without departing from the scopes of the methods 600, 700. The descriptions of the methods 600, 700 are made with reference to the features depicted in FIGS. 1-5 for purposes of illustration.

With reference first to FIG. 6, at block 602, the processor 102 may identify a first time period 210 and a second time period 222 during which power is to be applied to components 504-510 of a heated system 300, 400. The first time period 210 may include a first set of power events 202-208 (e.g., power events for a first heating lamp 504, a second heating lamp 506, a first resistive heating element 508, and a second resistive heating element 510) and a zero power event 212 for the components 504-510. The second time period 222 may include a second set of power events 230-236 and a second zero power event 214 for the components 504-510. For example, the processor 102 may determine the intended or scheduled power events for the components 504-510 and the zero power events 212-214 that are to be implemented during each of the time periods of a steady-state or maintenance power operation cycle.

At block 604, the processor 102 may assign a portion of a second power event 234 of the second set of power events 230-236 from the second time period 222 to a first power event 206 of the first set of power events 204-208. In an example, the processor 102 may assign a portion of a second power event 234 of the second set of power events 230-236 that has an equal time duration as the first zero power event 212 in the first period 210. In other examples, the processor 102 may assign a portion of a second power event 234 that does not have an equal time duration as the first zero power event 212. In addition, the processor 102 may assign the portion of the second power event 234 based on a determination that the heated system 300, 400 is operating in a maintenance heating cycle.

At block 606, the processor 102 may apply a portion of the assigned second power event 234 to a first power event 206 for the first set of power events during the first time period 210 to remove the first zero power event 212 from first time period 210 and smooth power delivery to the heated system 300, 400. In examples, the processor 102 may apply the assigned portion of the second power event 234 to a power event in the first time period for a component that draws a relatively lower amount of power. For instance, and as shown in FIG. 2B, the processor 102 may apply the assigned portions of the second power events 234, 236 to the power events 206, 208 to the first resistive element and the second resistive element. In some examples, the processor 102 may apply a power event to the same servo from which a power event was borrowed.

At block 608, the processor 102 may add the first zero power event 212 that was removed from the first time period 210 to another zero power event in another time period. For instance, and as shown in FIG. 2B, the processor 102 may increase the duration of time of a zero power event 252 by adding the first zero power event 212 from the first time period 210 to the second zero power event 214 to create a combined zero power event 252.

Although the method 600 has been described with respect to a power event from a later time period being assigned to a zero power event in an earlier time period, it should be understood that a power event from an earlier time period may be assigned to a zero power event in a later time period without departing from the scope of the method 600.

Turning now to FIG. 7, at block 702, the processor 102 may identify a plurality of time periods during which power is to be applied to components of a heated system 300, 400. Particularly, the processor 102 may identify the time periods of a steady-state power application cycle for the heated system 300, 400.

At block 704, the processor 102 may track a plurality of durations of time corresponding to a plurality of additional power events assigned from a plurality of additional time periods. That is, the processor 102 may track a plurality of power events that may be assigned from additional power events, for instance, in an arbitration bank as credits. The processor 102 may also track the durations of time corresponding to the additional assigned power events.

At block 706, the processor 102 may determine whether the tracked plurality of durations of time exceed a predefined threshold. The predefined threshold may be user-defined and/or may be based on testing. In some examples, the predefined threshold may be based on a duration of time of a zero power event in the first time period 210.

At block 708, based on the tracked plurality of durations of borrowed time being determined to exceed the predefined threshold, the processor 102 may extend a current zero power event in a current period. That is, for instance, the processor 102 may cause a duration of time of a zero power event in the current period to be increased based on the tracked durations of time exceeding the predefined threshold. In one regard, the duration of borrowed time of a zero power event in the current period may be increased to maintain temperatures of the heat generating components and/or a corresponding component heated by the heat generating component of the heated system 300, 400 within predefined ranges over the duration of the steady-state power application cycle.

At block 710, based on the tracked plurality of durations of borrowed time being determined to not exceed the predefined threshold or following block 708, the processor 102 may determine whether application of the assigned second power event to the first power event during the first time period 210 is to cause a temperature of a heat generating component and/or a corresponding component heated by the heat generating component of the heated system 300, 400 to exceed the temperature bound for the component. The temperature bound for the component may be an upper operating temperature limit of the component, e.g., a temperature level at which the component, such as a belt 404 heated by the heating lamp, may be operating at an unintended or unsafe temperature.

At block 712, based on the application of the portion of the second power event to the first power event being determined as causing the temperature of the component or a corresponding component heated by the heat generating component to be below the temperature bound, the processor 102 may assign the second power event to the first power event as discussed above with respect to blocks 604 and 608. However, based on the application of the second power event to the first power event being determined as causing the temperature of the component or a corresponding component heated by the heat generating component to exceed the temperature bound, the processor 102 may not assign the second power event to the first power event, as shown at block 714. The processor 102 may also not assign the second power event following block 708.

Some or all of the operations set forth in the methods 600 and 700 may be included as utilities, programs, or subprograms, in any desired computer accessible medium. In addition, the methods 600 and 700 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is, therefore, to be understood that any electronic device capable of executing the above-described functions may perform those functions enumerated above.

Turning now to FIG. 8, there is shown an example non-transitory computer readable medium 800 for application of power to a heated system 300, 400 to smooth power delivery to the heated system 300, 400. The non-transitory computer readable medium 800 may be an electronic, magnetic, optical, or other physical storage device that contains or stores executable instructions. The computer readable medium 800 may be, for example, Random Access memory (RAM), an Electrically Erasable Programmable Read-Only Memory (EEPROM), a storage device, an optical disc, and the like.

The non-transitory computer readable storage medium 800 may have stored thereon machine readable instructions 802-806 that a processor, e.g., the processor 102, may execute. The machine readable instructions 802 may cause the processor to, for a maintenance heating cycle of a heated system 300, 400, identify a first time period 210 and a second time period 222 during which power is to be applied to heat generating components 504-510 of the heated system 300, 400. The first time period 210 may include a first set of power events 202-208 and a first zero power event 212 for the heat generating components 504-510 and the second time period 222 may include a second set of power events 230-236 and a second zero power event 214 for the heat generating components 504-510.

The machine readable instructions 804 may cause the processor to track a credit corresponding to a second power event 234 of the second set of power events 230-236 from the second time period 222 to be applied to a first power event 206 of the first set of power events 202-208. In addition, the machine readable instructions 806 may apply the tracked credit to the first power event 206 during the first time period 210 to remove the first zero power event 212 from the first time period 210 and smooth power delivery to the heated system 300, 400.

In some examples, the non-transitory computer readable medium 800 may include additional instructions that may cause the processor to determine whether application of the tracked credit to the first power event during the first time period 210 is to cause a temperature of a heat generating component 504-510 and/or a corresponding component heated by the heat generating component 504-510 of the heated system 300, 400 to exceed the temperature bound for the heat generating component 504-510 and/or a corresponding component heated by the heat generating component 504-510. Based on the application of the tracked credit to the first power event being determined as causing the temperature of the heat generating component 504-510 and/or a corresponding component heated by the heat generating component 504-510 to be below the temperature bound, the processor may track the credit and apply the tracked credit to the first power event. However, based on the application of the tracked credit to the first power event being determined as causing the temperature of the heat generating component 504-510 and/or a corresponding component heated by the heat generating component 504-510 to exceed the temperature bound, the processor may not track the credit nor apply the tracked credit to the first power event.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium storing machine readable instructions that when executed by the processor cause the processor to:
   identify a first period for a heated system, the first period including a first set of power events and a first zero power event for the heated system;
   identify a second period for the heated system, the second period including a second set of power events and a second zero power event for the heated system;
   borrow, from the second period, a portion of a second power event of the second set of power events; and
   apply the borrowed portion of the second power event to a first power event of the first set of power events during the first period to remove the first zero power event from the first period.

2. The apparatus of claim 1, wherein the second period includes the second zero power event, and wherein the instructions are further to cause the processor to:
   increase a duration of time of the second zero power event during the second period to compensate for the application of the borrowed portion of the second power event for the first period.

3. The apparatus of claim 1, wherein the instructions are further to cause the processor to:
   determine that the heated system is operating in a maintenance heating cycle; and
   borrow the second power event based on the heated system being determined as operating in the maintenance heating cycle.

4. The apparatus of claim 1, wherein the heated system includes a first heating component and a second heating component, the first heating component having a shorter or longer thermal time constant than the second heating component, wherein the second power event borrowed from the second period corresponds to power intended to be applied to the second heating component during the second period, and wherein the instructions are further to cause the processor to apply the borrowed portion of the second power event to the second heating component during the first period.

5. The apparatus of claim 1, wherein the heated system includes a first heating lamp, a second heating lamp, a first resistive heating element, and a second resistive heating element, and wherein the portion of the second power event borrowed from the second period corresponds to power intended to be applied to the first resistive heating element and the second resistive heating element during the second period, and wherein the instructions are further to cause the processor to apply the borrowed portion of the second power event to the first resistive heating element and the second resistive heating element during the first period.

6. The apparatus of claim 1, wherein the second period is to occur at a time following occurrence of the first period, and wherein the instructions further cause the processor to:
   track a duration of time corresponding to the borrowed portion of the second power event;
   determine whether the tracked duration of time exceeds a predefined threshold; and
   based on the tracked duration of time being determined to exceed the predefined threshold, extend a current zero power event in a current period.

7. The apparatus of claim 1, wherein the heated system includes temperature bounds for components of the heated system, and wherein the instructions are further to cause the processor to:
   determine whether application of the borrowed portion of the second power event to the first power event during the first period is to cause a temperature of a component of the heated system to exceed the temperature bound for the component;
   based on the application of the borrowed portion of the second power event to the first power event being determined as causing the temperature of the component to be below the temperature bound, borrow the portion of the second power event and apply the borrowed portion of the second power event to the first power event; and
   based on the application of the borrowed portion of the second power event to the first power event being determined as causing the temperature of the component to exceed the temperature bound, not borrow the portion of the second power event from the second period.

8. The apparatus of claim 1, wherein the instructions are further to cause the processor to:
   track a plurality of durations of time corresponding to a plurality of borrowed second power events;
   determine whether the tracked plurality of durations of time exceeds a predefined threshold; and
   based on the tracked plurality of durations of time being determined to exceed the predefined threshold, extend a current zero power event in a current period.

9. A method comprising:
   identifying, by a processor, a first time period and a second time period during which power is to be applied to components of a heated system, the first time period including a first set of power events and a first zero power event for the components and the second time period including a second set of power events and a second zero power event for the components;
   assigning, by the processor, a portion of a second power event of the second set of power events from the second time period;
   applying, by the processor, the assigned portion of the second power event to a first power event of the first set of power events during the first time period to remove the first zero power event from the first time period; and
   adding, by the processor, a time corresponding to the first zero power event from the first time period to another zero power event in another time period.

10. The method of claim 9, further comprising:
    tracking a plurality of durations of time corresponding to a plurality of additional power events assigned from a plurality of additional time periods;
    determining whether the tracked plurality of durations of time exceeds a predefined threshold; and
    based on the tracked plurality of durations of time being determined to exceed the predefined threshold, extending a current zero power event in a current time period.

11. The method of claim 9, further comprising:
    determining that the heated system is operating in a maintenance heating cycle; and
    assigning the portion of the second power event based on the heated system being determined as operating in the maintenance heating cycle.

12. The method of claim 9, wherein the heated system includes temperature bounds for the components of the heated system, the method further comprising:
    determining whether application of the assigned portion of the second power event to the first power event during the first time period is to cause a temperature of a component of the heated system to exceed the temperature bound for the component; and
    based on the application of the assigned portion of the second power event to the first power event being determined as causing the temperature of the component to be below the temperature bound, assigning the portion of the second power event and applying the assigned portion of the second power event to the first power event.

13. The method of claim 9, wherein the heated system includes temperature bounds for the components of the heated system, the method further comprising:
    determining whether application of the assigned portion of the second power event to the first power event during the first time period is to cause a temperature of a component of the heated system to exceed the temperature bound for the component; and
    based on the application of the assigned portion of the second power event to the first power event being determined as causing the temperature of the component to exceed the temperature bound, not assigning the portion of the second power event to the first power event.

14. A non-transitory computer-readable medium comprising machine readable instructions that when executed by a processor, cause the processor to:
- for a maintenance heating cycle of a heated system, identify a first time period and a second time period during which power is to be applied to components of the heated system, the first time period including a first set of power events and a first zero power event for the components and the second time period including a second set of power events and a second zero power event for the components;
- track a credit corresponding to a portion of a second power event of the second set of power events from the second time period to be applied to a first power event of the first set of power events; and
- apply the tracked credit to the first power event during the first time period to remove the first zero power event from the first time period.

15. The non-transitory computer-readable medium of claim 14, wherein the heated system includes temperature bounds for the components of the heated system, and wherein the instructions are further to cause the processor to:
- determine whether application of the tracked credit to the first power event during the first time period is to cause a temperature of a component of the heated system to exceed the temperature bound for the component;
- based on the application of the tracked credit to the first power event being determined as causing the temperature of the component to be below the temperature bound, track the credit and apply the tracked credit to the first power event; and
- based on the application of the tracked credit to the first power event being determined as causing the temperature of the component to exceed the temperature bound, not track the credit.

* * * * *